United States Patent
Hall et al.

(10) Patent No.: US 10,703,152 B2
(45) Date of Patent: Jul. 7, 2020

(54) SINGLE WHEEL SWING ARM WITH TROUGH

(71) Applicants: David R. Hall, Provo, UT (US); Stephen R. Hall, Draper, UT (US); Christoper Johnson, Provo, UT (US); Joseph Duncan, Provo, UT (US); Eric Magleby, Provo, UT (US)

(72) Inventors: David R. Hall, Provo, UT (US); Stephen R. Hall, Draper, UT (US); Christoper Johnson, Provo, UT (US); Joseph Duncan, Provo, UT (US); Eric Magleby, Provo, UT (US)

(73) Assignee: Hall Labs LLC, Provo, UT (US)

( * ) Notice: Subject to any disclaimer, the term of this patent is extended or adjusted under 35 U.S.C. 154(b) by 107 days.

(21) Appl. No.: 15/160,276

(22) Filed: May 20, 2016

(65) Prior Publication Data
US 2017/0334259 A1 Nov. 23, 2017

(51) Int. Cl.
*B60G 3/06* (2006.01)
*B60G 3/14* (2006.01)
*B60G 3/12* (2006.01)
*B62D 61/06* (2006.01)
*B60G 7/00* (2006.01)

(52) U.S. Cl.
CPC .............. *B60G 3/06* (2013.01); *B60G 3/12* (2013.01); *B60G 3/14* (2013.01); *B60G 7/001* (2013.01); *B62D 61/06* (2013.01); *B60G 2200/1322* (2013.01); *B60G 2300/122* (2013.01)

(58) Field of Classification Search
CPC ........ B62D 21/11; B62D 21/15; B62D 61/06; B62D 61/065; B62K 25/10; B62K 25/005; B60G 7/001; B60G 3/06; B60G 3/08; B60G 3/14; B60G 3/145; B60G 3/22
See application file for complete search history.

(56) References Cited

U.S. PATENT DOCUMENTS

| | | | | |
|---|---|---|---|---|
| 3,672,698 A | * | 6/1972 | Froumajou | B60G 3/14 267/256 |
| 4,280,717 A | * | 7/1981 | Hanai | B60G 3/14 280/124.128 |
| 4,574,902 A | * | 3/1986 | Irimajiri | B60K 17/306 180/312 |
| 4,703,824 A | * | 11/1987 | Irimajiri | B62D 61/065 180/210 |
| 4,742,884 A | * | 5/1988 | Ishikawa | B60T 1/065 180/219 |
| 4,809,802 A | * | 3/1989 | Seino | B62K 25/005 180/227 |

(Continued)

*Primary Examiner* — Barry Gooden, Jr.

(57) ABSTRACT

An apparatus for pivotally fixing a non-driven wheel assembly to a vehicle frame is disclosed. The apparatus provides a trough through which non-driven wheel assembly components can be passed and protected. In one embodiment, the trough is circular in shape and is fully enclosed by the apparatus. In other embodiments, the trough has various shapes and comprises retaining members to secure and protect non-driven wheel assembly components. A suspension system interface is provided that allows the apparatus to suspend the non-driven wheel assembly. Openings used to pivotally and rigidly fix a mounting plate, suspension system, pivotal axes, and fender assemblies are also disclosed and claimed herein.

20 Claims, 15 Drawing Sheets

(56) References Cited

U.S. PATENT DOCUMENTS

| | | | | |
|---|---|---|---|---|
| 5,248,011 | A * | 9/1993 | Richards | B60G 3/01 180/215 |
| 5,361,864 | A * | 11/1994 | Tanaka | B62K 25/005 180/219 |
| 5,431,243 | A * | 7/1995 | Richards | B60G 3/01 180/211 |
| 6,464,030 | B1 * | 10/2002 | Hanagan | B62D 7/142 180/211 |
| 7,588,110 | B2 * | 9/2009 | Martino | B62D 61/06 180/210 |
| 8,398,159 | B1 * | 3/2013 | Hall | B62D 23/00 296/203.01 |
| 9,221,508 | B1 * | 12/2015 | de Haan | B60N 2/005 |
| 9,855,809 | B2 * | 1/2018 | Gordon | B60G 7/001 |
| 2007/0151789 | A1 * | 7/2007 | Bracy | B62K 11/04 180/219 |
| 2008/0315550 | A1 * | 12/2008 | Parker | B62K 21/00 280/276 |
| 2010/0078237 | A1 * | 4/2010 | Yonehana | B62K 25/005 180/65.51 |
| 2011/0272906 | A1 * | 11/2011 | Hall | B60G 3/08 280/124.116 |
| 2012/0000724 | A1 * | 1/2012 | Mimura | B60K 7/0007 180/291 |
| 2016/0229478 | A1 * | 8/2016 | Stephani | B62K 5/05 |
| 2016/0264211 | A1 * | 9/2016 | Runman | B62K 25/283 |
| 2016/0318573 | A1 * | 11/2016 | Ishii | B62J 99/00 |
| 2017/0050483 | A1 * | 2/2017 | Gordon | B60G 7/001 |
| 2018/0154942 | A1 * | 6/2018 | Hall | B62D 21/152 |

\* cited by examiner

SINGLE WHEEL SWING ARM WITH TROUGH

BACKGROUND

Field of the Invention

This invention relates to apparatuses used to pivotally fix a single vehicle wheel to a vehicle frame.

Background of the Invention

Swing arms are typically used on vehicles where a single wheel, as opposed to two wheels connected by an axle, is fixed to a vehicle frame. Swing arms are especially common in motorcycle design, where one or both wheels are attached to the vehicle frame through a swing arm. The primary purpose of such a swing arm is to provide a strong structural connection of the wheel to the vehicle frame while withstanding significant forces imposed by movement of the vehicle and loads carried by the vehicle. Furthermore, many swing arms have the additional purpose of providing a structure through which a wheel's non-rotational movement can be decelerated and dampened by means of a suspension system, thus imposing smaller stresses on vehicle frame members and increasing passenger comfort.

In the case of a motorcycle, a swing arm may be used at the rear side of the vehicle to pivotally fix and suspend a driven wheel. Often the wheel is driven by a system of gears and sprockets connected with a driving belt or chain. In such an application, the swing arm's design is affected considerably by the need to incorporate driving components and the need to account for the dynamics of driving a suspended, load-bearing wheel. The swing arm may attach to one or two sides of the wheel's rotational axis in order to pivotally fix the wheel to the vehicle frame.

Three-wheeled vehicles are gaining popularity as their unique aesthetics and design become more widely recognized. A three-wheeled vehicle usually requires a swing arm based on the fact that at least one of the three wheels it utilizes must be at the rear of the vehicle while the other two balance the vehicle by being at the front (or vice versa). However, it is advantageous to drive the pair of two wheels rather than the single wheel for the benefit of increased traction and proximity to the engine. Since three-wheeled designs are uncommon, a swing arm design and manufacturing procedure must also accommodate low production quantities and costs while maintaining tight tolerances.

The majority of swing arms in the art are used on vehicles which drive the single wheel attached to the swing arm using a driving belt or chain. In addition, swing arms do not commonly have inherent features (rather than external ones) which accommodate and protect wheel assembly components (wires, brake lines, etc.) which must traverse the distance between the vehicle frame and the wheel assembly fixed to the swing arm. Thus there is a need in the art for a swing arm that attaches a non-driven wheel assembly to a vehicle frame while accommodating and protecting wheel assembly components.

SUMMARY

This invention has been developed in response to the present state of the art and, in particular, in response to the problems and needs in the art that have not yet been fully solved by a currently available apparatus. Accordingly, an improved apparatus has been developed to pivotally fix a non-drive wheel to a vehicle frame. Features and advantages of different embodiments of the invention will become more fully apparent from the following description and appended claims, or may be learned by implementation of the invention as set forth hereinafter.

Consistent with the foregoing, a swing arm is disclosed. A particular implementation of the swing arm on a reverse-trike roadster is disclosed. Different geometries used to interface portions of the swing arm with a separate mounting plate are disclosed. Additional features such as vehicle frame member interfaces, suspension system interfaces, and structural supports are disclosed. A trough and several embodiments thereof are disclosed. Methods of manufacturing the swing arm are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
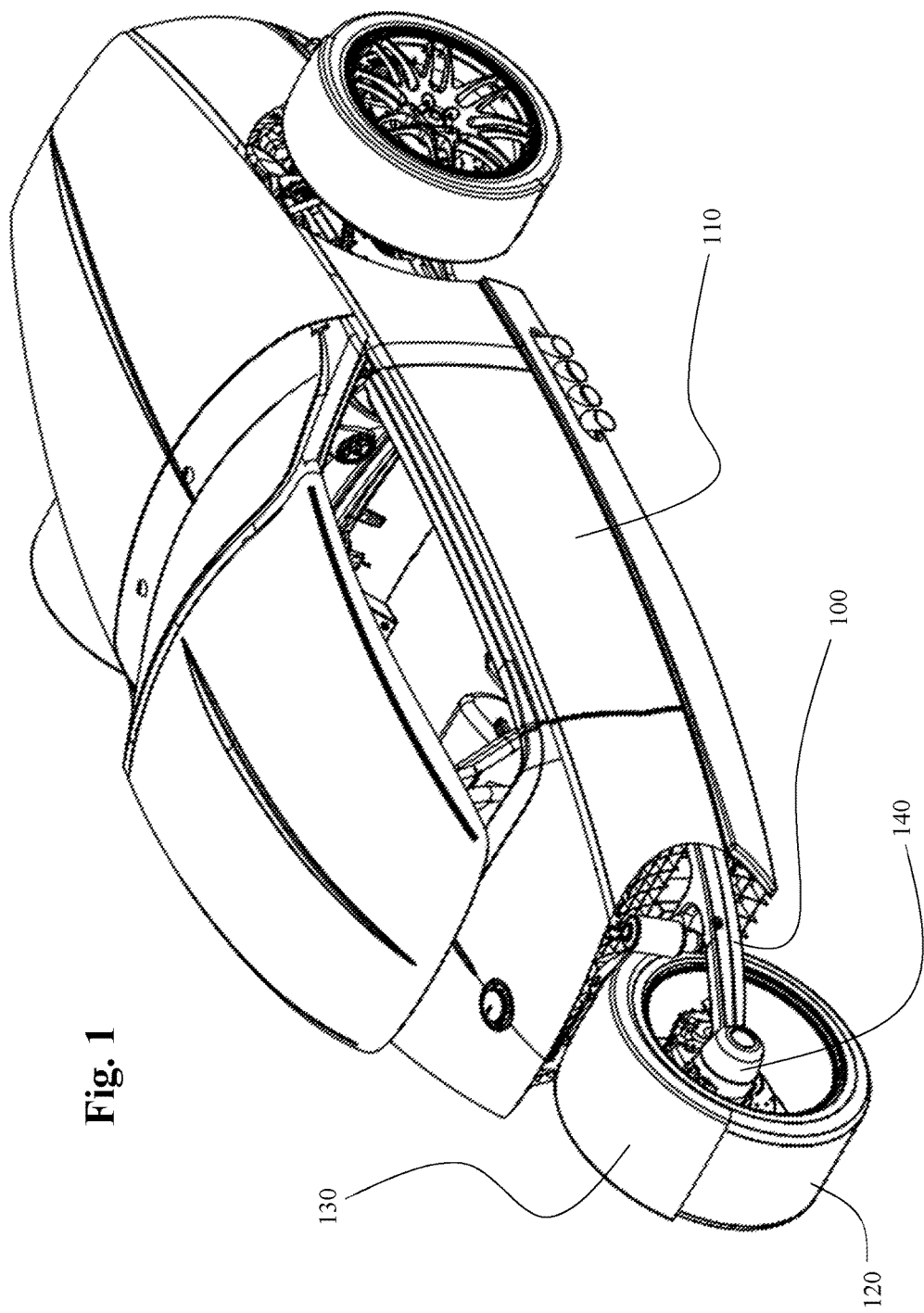
FIG. 1 is a perspective view of a reverse trike vehicle utilizing the present invention at the rear side of the vehicle with an assembly cover.

Referring to FIG. 1, a perspective view of one application of one embodiment of the present invention is shown. A swing arm 100 is shown which pivotally fixes a rear wheel 120 to a three-wheeled vehicle body 110. The three-wheeled vehicle is shown in its completely assembled state, which includes a wheel guard 130 over the rear wheel 120 and housing 140 which covers and protects components at the interface between the swing arm 100 and other components which are obstructed in this view.

Figure 2:
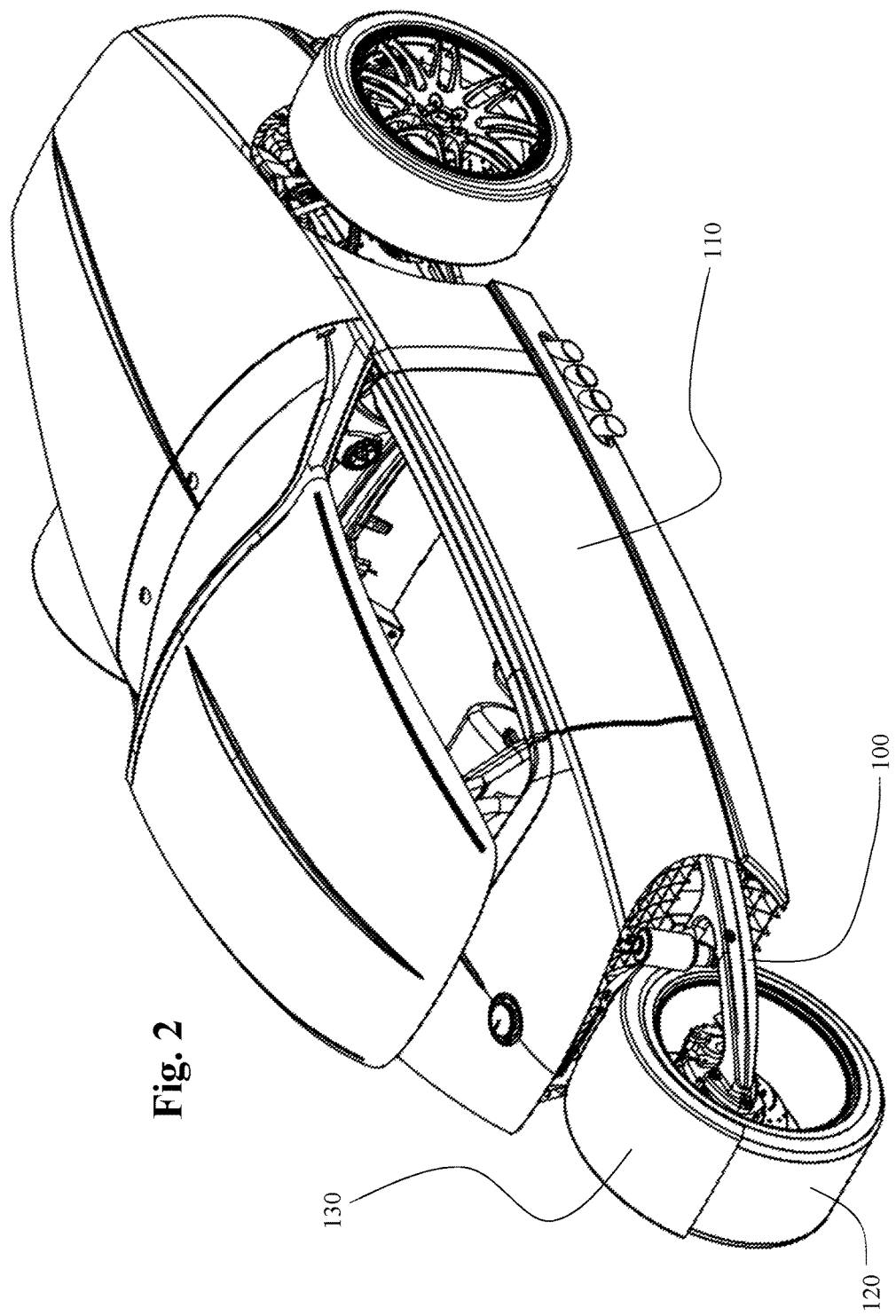
FIG. 2 is a perspective view of the reverse trike vehicle of FIG. 1 without an assembly cover.

FIG. 2 shows the same perspective view as FIG. 1 showing the same application and embodiment of the present invention as FIG. 1. The swing arm 100 is shown which pivotally fixes the rear wheel 120 to the three-wheeled vehicle body 110. A wheel guard 130 is shown covering a portion of the rear wheel 120. Unlike FIG. 1, the housing 140 is not shown in order to expose the manner in which the swing arm 100 interfaces with non-driven wheel assembly components.

Figure 3:
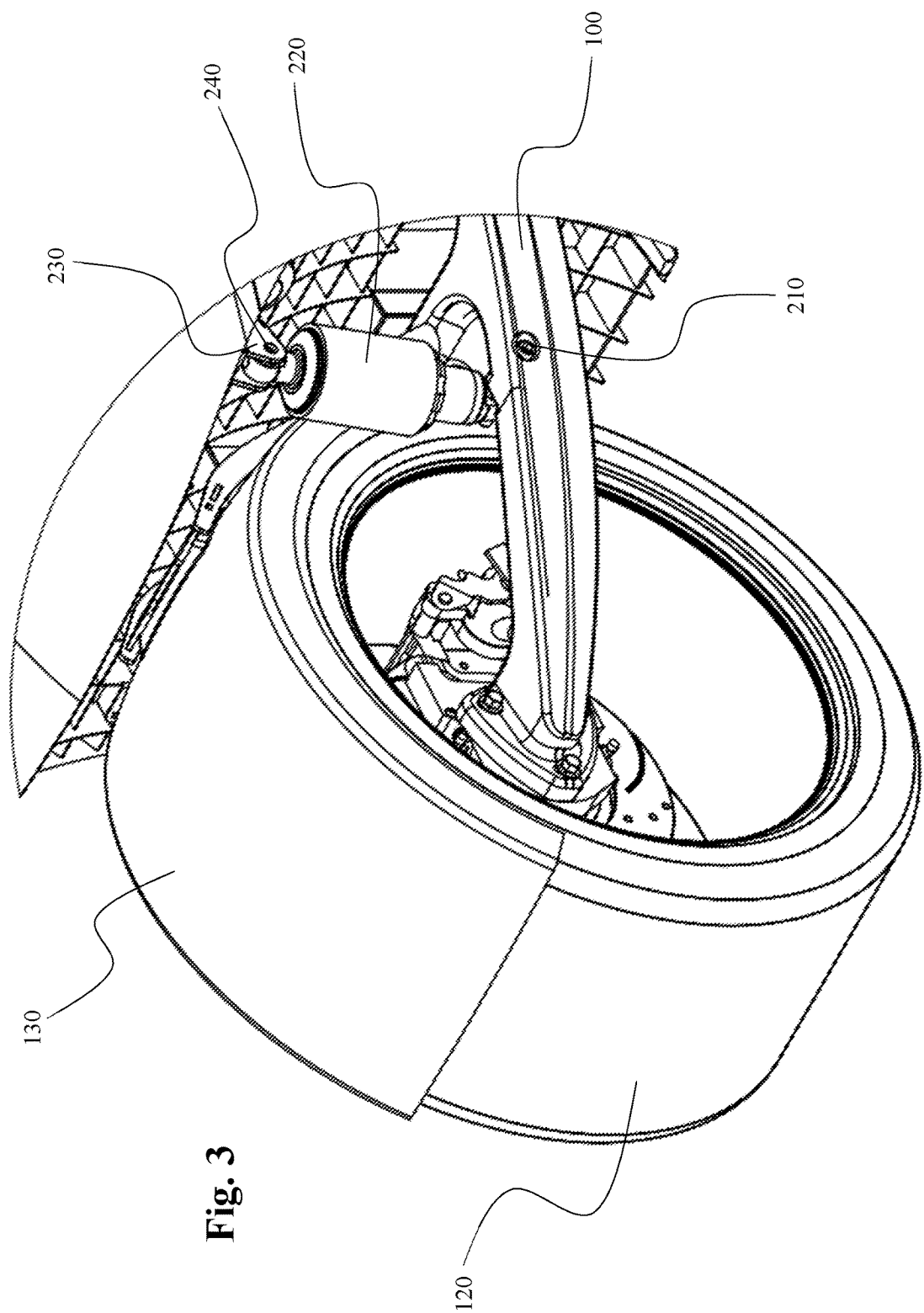
FIG. 3 is a close-up view of the rear wheel of the vehicle shown in FIG. 2.

FIG. 3 shows a close-up view of the swing arm 100 of FIG. 2. The swing arm is shown further comprising a third pivotal axis 210 through which a suspension system 220 is pivotally fixed to the swing arm 100. The suspension system 220 is also pivotally fixed on another end to third vehicle frame members 230 by means of a fourth pivotal axis 240. The swing arm 100 is pivotally fixed to the vehicle frame in a manner shown hereafter, and the suspension system 220 decelerates and dampens the pivotal motion of the swing arm 100 about its pivotal axis. FIG. 3 also shows the same rear wheel 120 and wheel guard 130 as shown in FIG. 2.

Figure 4:
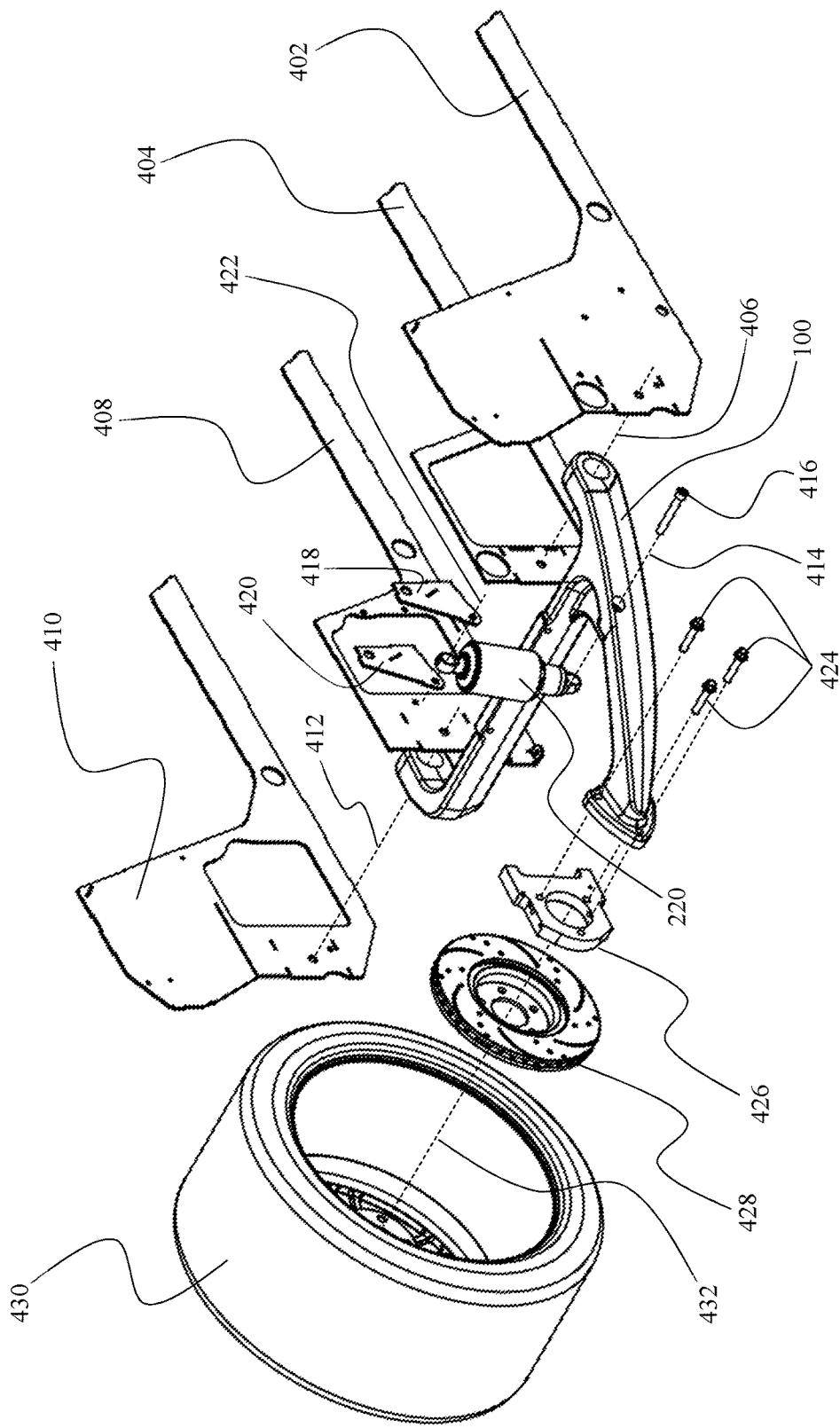
FIG. 4 is an exploded perspective view of a swing arm attached to vehicle frame members, a suspension system, a mounting plate, and wheel assembly components.

FIG. 4 shows a perspective exploded view of the swing arm 100 and other major components with which said swing arm 100 interfaces with. The swing arm 100 is shown having a first pivotal axis 406 and a second pivotal axis 412. The swing arm 100 is pivotally fixed at the first pivotal axis 406 to a first vehicle frame member, said first vehicle frame member being comprised of a first vehicle frame first panel 402 and a first vehicle frame second panel 404. The swing arm 100 is also pivotally fixed at the second pivotal axis 412 to a second vehicle frame member comprised of a second vehicle frame first panel 408 and a second vehicle frame second panel 410. The first vehicle frame first panel 402, the first vehicle frame second panel 404, the second vehicle frame first panel 408, and the second vehicle frame second panel 410 are further comprised of tabs and slots, said tabs fitting into slots of other panels and said slots fitting into the tabs of other panels. These tab and slot panels are then welded together onto the vehicle frame. As such, the first vehicle frame member and the second vehicle frame member are welded onto the remainder of a vehicle frame not shown here, and are understood to be rigidly fixed extensions of the vehicle frame. The suspension system 220 is also shown, said suspension system 220 being pivotally fixed to the swing arm 100 at the third pivotal axis 414, the third pivotal axis further comprising a bolt 416. The suspension system is also pivotally fixed to third vehicle frame members 418, 420 which are understood to be rigidly fixed extensions of the vehicle frame. Also shown are mounting bolts 424 which are used to rigidly fix a mounting plate 426 to the swing arm 100. The mounting plate 426 is also fixed to a brake disk 428, which is fixed to the wheel 430, the mounting plate 426, brake disk 428, and wheel 430 being fixed coaxially along a wheel axis 432. Other components such as a bearing housing and brake calipers are used in the non-driven wheel assembly but not shown in FIG. 4 because their use is non-novel and commonplace in vehicle wheel assemblies.

Figure 5:
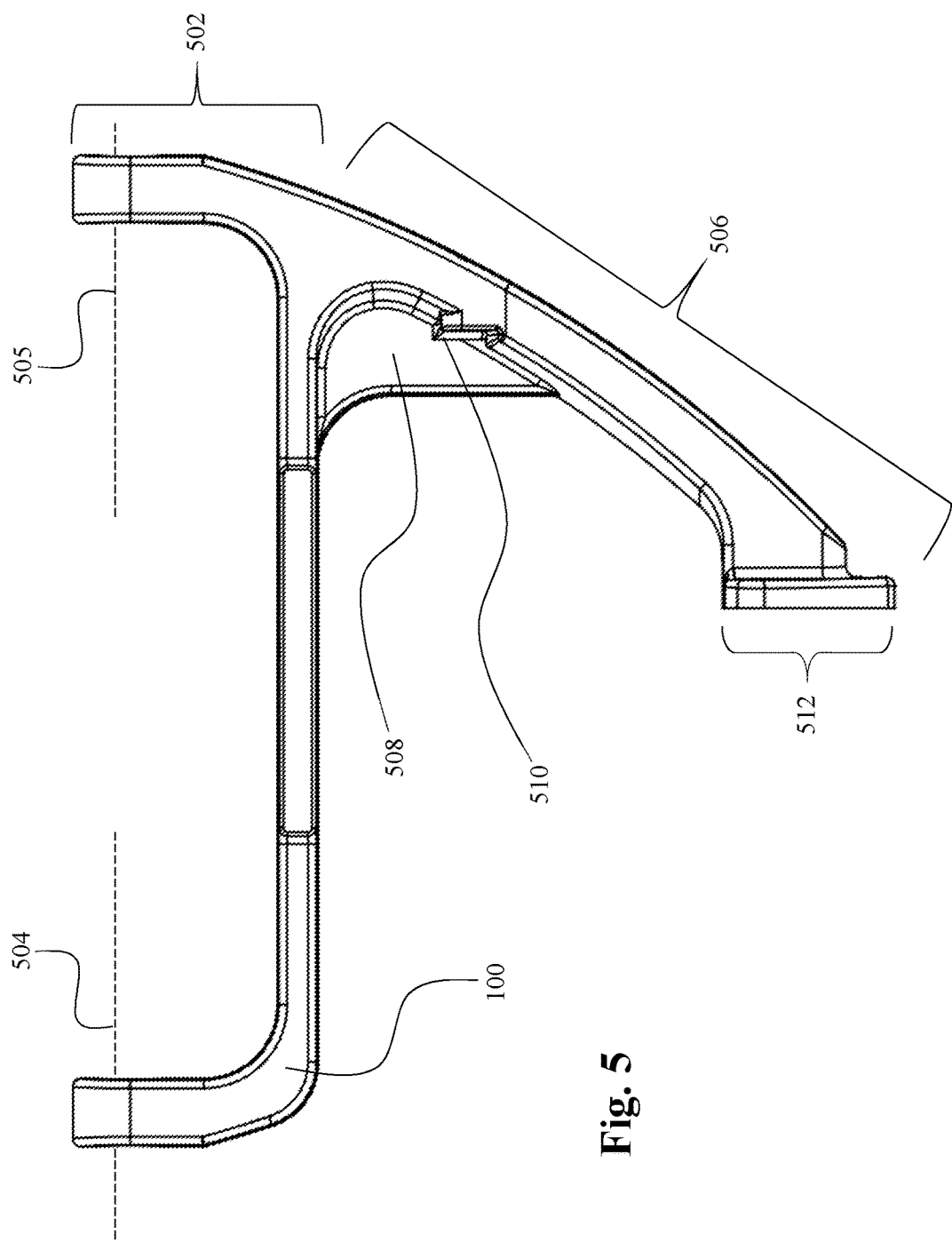
FIG. 5 is a top-down view of a swing arm.

FIG. 5 shows a top-down view of the swing arm 100. The swing arm further comprises a yoke portion 502 and an arm portion 506. The yoke portion is shown to be U-shaped and further comprises a first pivotal axis 505 and a second pivotal axis 504 which are also shown to be coaxial. The arm portion 506 is shown to further comprise a suspension system interface 510, which changes the geometry of the arm portion to allow a suspension system to be pivotally fixed to the arm portion 506 along a pivotal axis parallel to the first pivotal axis 505 and the second pivotal axis 504. The arm portion 506 is also shown to further comprise a rib 508 between at least a portion of the arm portion 506 and a portion of the yoke portion 502.

Figure 6:
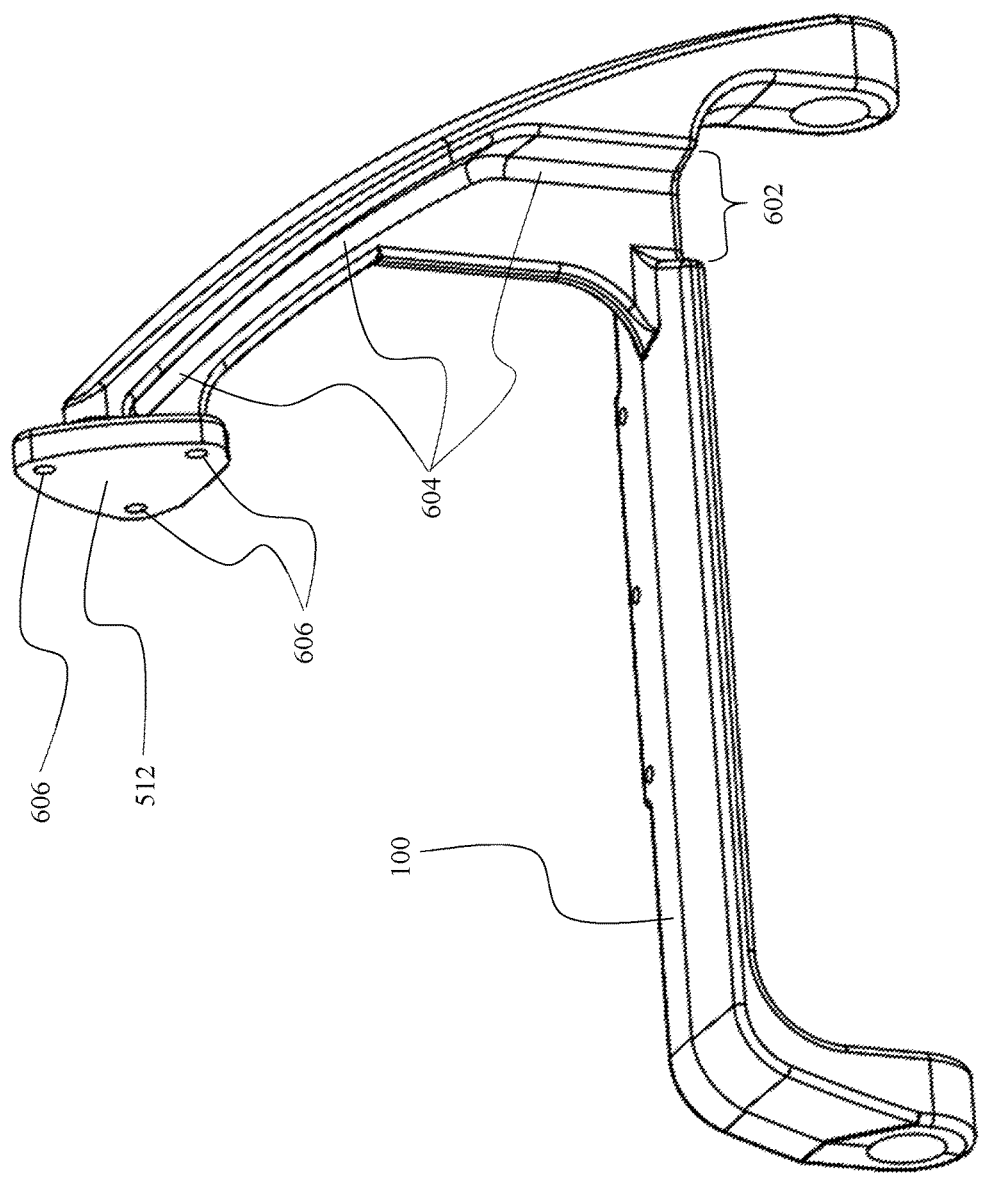
FIG. 6 is a perspective view of the underside of one embodiment of a swing arm.

FIG. 6 shows a perspective view of the underside of the swing arm 100. On the underside, the swing arm 100 further comprises a trough 604, said trough 604 comprising a trough opening 602 in the yoke portion of the swing arm 100. This trough 604 allows the passage of components, especially lines, tubes, and/or wires, between the vehicle body and the non-driven wheel assembly affixed to the swing arm 100. The manner in which said components pass through and are fixed to the swing arm 100 will be shown hereafter in FIGS. 7, 12, 13, and 14A through 14C. The orthogonal interface 512 is also shown, along with fifth openings 606 through the orthogonal interface 512 which are used to rigidly fix the swing arm 100 to a mounting plate.

Figure 7:
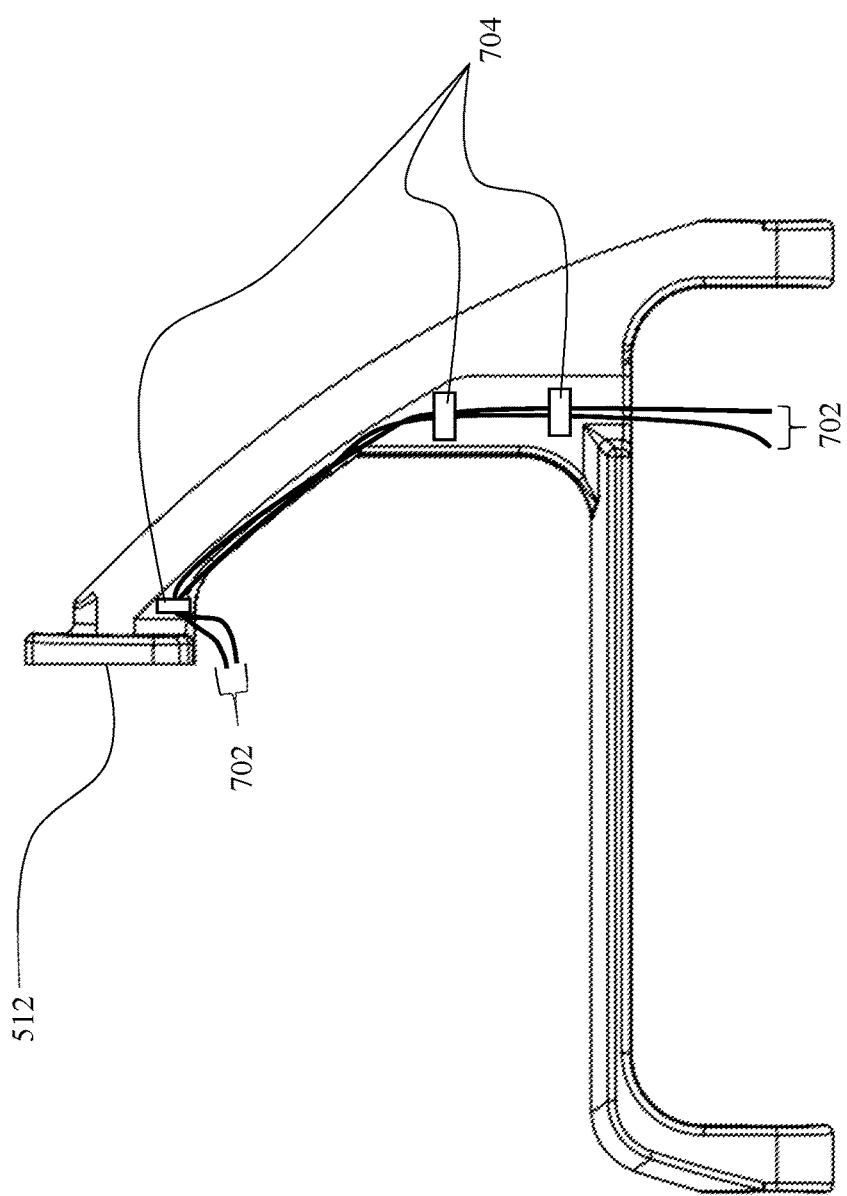
FIG. 7 is a bottom view of a swing arm showing the passage of wheel assembly components along a trough in the swing arm.

FIG. 7 shows a bottom view of the swing arm with non-driven wheel assembly components 702. The non-driven wheel assembly components 702 are fixed to the underside of the swing arm using fasteners 704 which guide said non-driven wheel assembly components 702 and prevent them from extending beyond the profile of the swing arm. The non-driven wheel assembly components pass through the trough opening and through the trough on the underside of the swing arm (the trough opening and the trough are shown in FIG. 6). Near the orthogonal interface of the arm portion of the swing arm, the non-driven wheel assembly components 702 leave the passage and are fixed to the non-driven wheel assembly.

Figure 8:
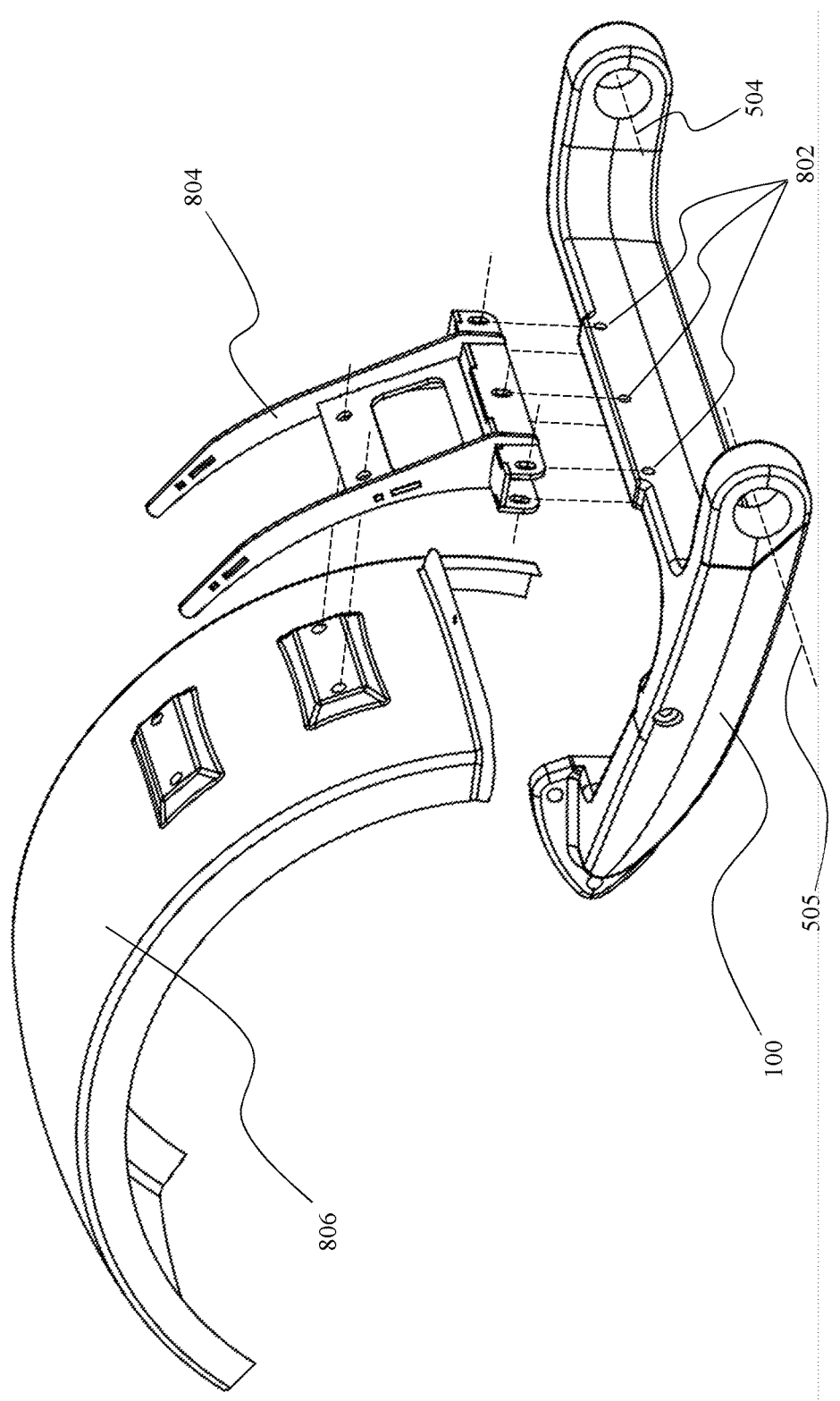
FIG. 8 is a perspective exploded view of a swing arm, fender assembly, and wheel guard.

FIG. 8 shows a perspective exploded view of the swing arm 100, a fender assembly 804, and a wheel guard 806. The yoke portion of the swing arm 100 is shown to further comprise a first pivotal axis 505 and a second pivotal axis 504, the first pivotal axis 505 and the second pivotal axis 504 being coaxial. The yoke portion of the swing arm 100 is shown to further comprise fourth openings 802 through which the fender assembly 804 is rigidly fixed to the swing arm 100. The fender assembly 804 is further comprised of tab and slot panels which are fitted and welded together. The wheel guard 806 is also shown to be rigidly fixed to the fender assembly 804.

Figure 9:
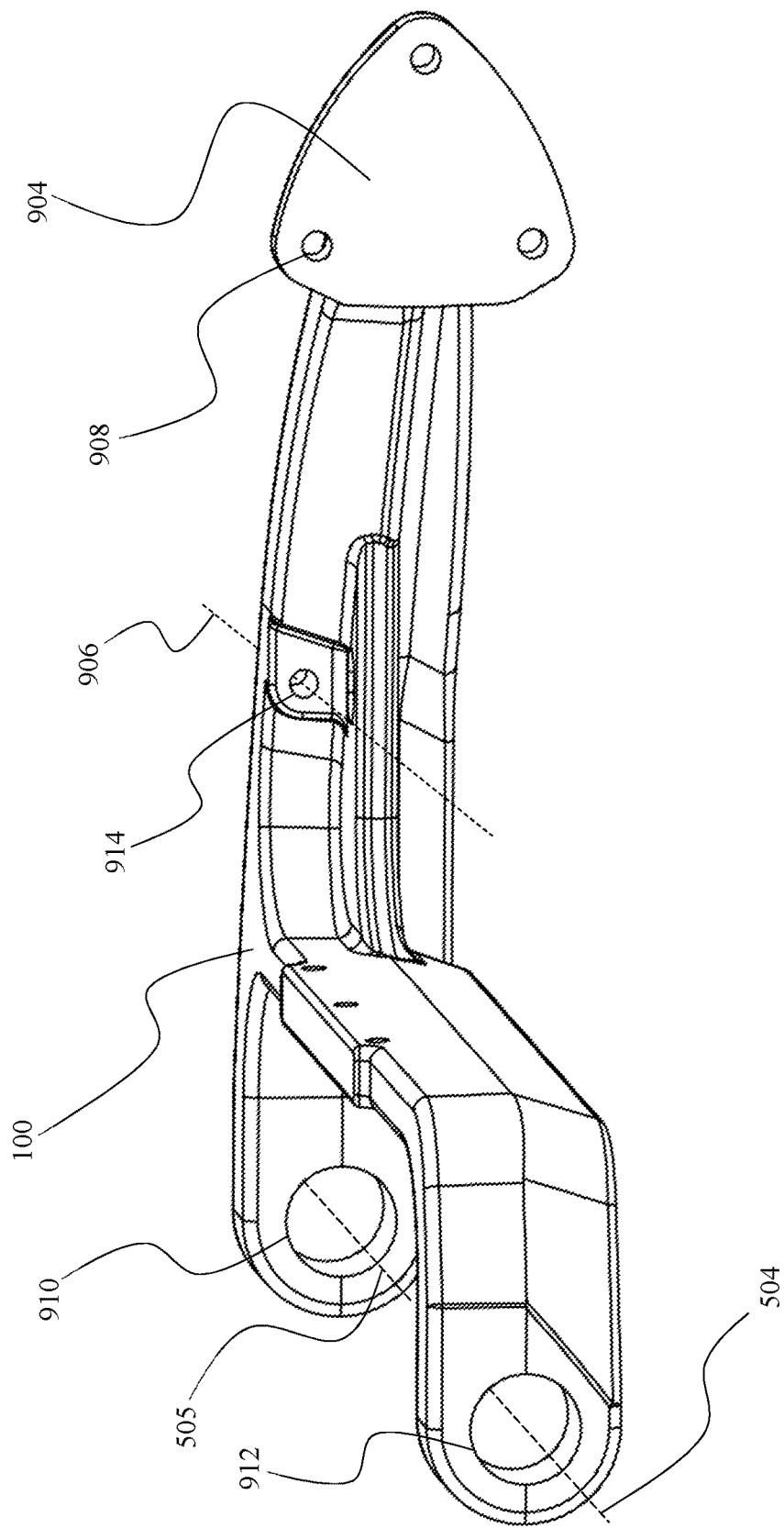
FIG. 9 is a perspective view of a swing arm with a triangular orthogonal interface.

FIG. 9 shows a perspective view of the swing arm 100. The swing arm 100 is shown to comprise a first pivotal axis 505 and a second pivotal axis 504. Furthermore, the first pivotal axis 505 is shown to comprise a first opening 910 and the second pivotal axis 504 is shown to comprise a second opening 912. The swing arm 100 is also shown to comprise a third pivotal axis 906 which comprises a third opening 914 through which a suspension system is pivotally fixed to the arm portion of the swing arm. The orthogonal interface 904 is shown to have a generally triangular shape with rounded corners, said orthogonal interface 904 further comprising fifth openings at each rounded corner of the generally triangular shape.

Figure 10:
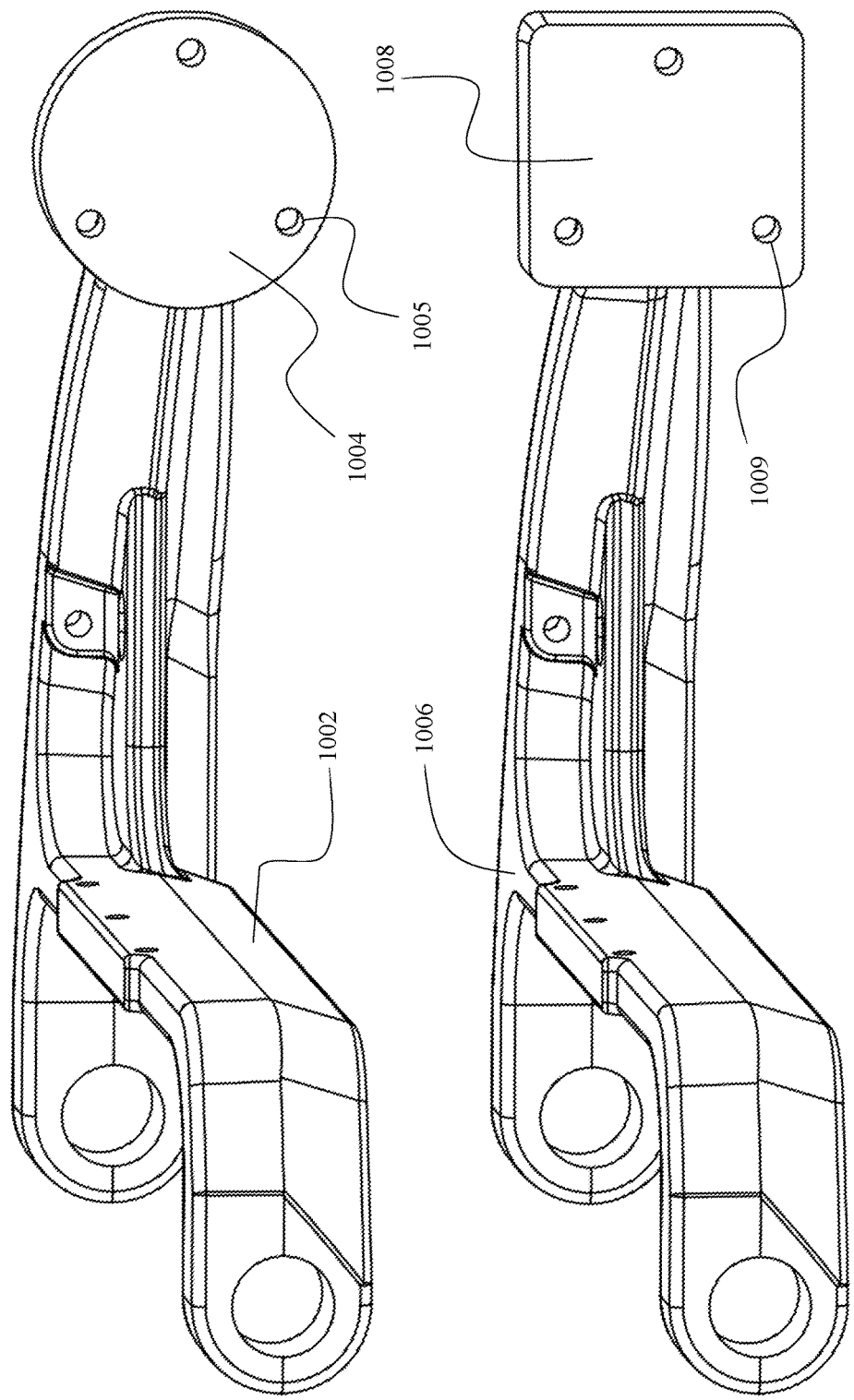
FIGS. 10A and 10B show perspective views of swing arms with circular and square orthogonal interfaces.

FIGS. 10A-10B show two additional embodiments of the swing arm, each having an orthogonal interface with a different shape. FIG. 10A shows a swing arm 1002 comprising an orthogonal interface 1004 with a circular shape. The circular shape provides a structural advantage which enables fifth openings 1005 in the orthogonal interface 1004 to withstand increased loads. FIG. 10B shows a swing arm 1006 comprising an orthogonal interface 1008 with a square shape, the corners of the square being rounded. The entire swing arm 1006 is manufactured by casting and then by machining the orthogonal interface 1008 and all openings on said swing arm 1006. The advantage of a square shape is that machining processes are simpler due to the ease of machining holes with reference to the distance of two sides of the square to a fifth opening 1009 in the orthogonal interface 1008. Thus, machining and quality control costs and time can be reduced.

Figure 11:
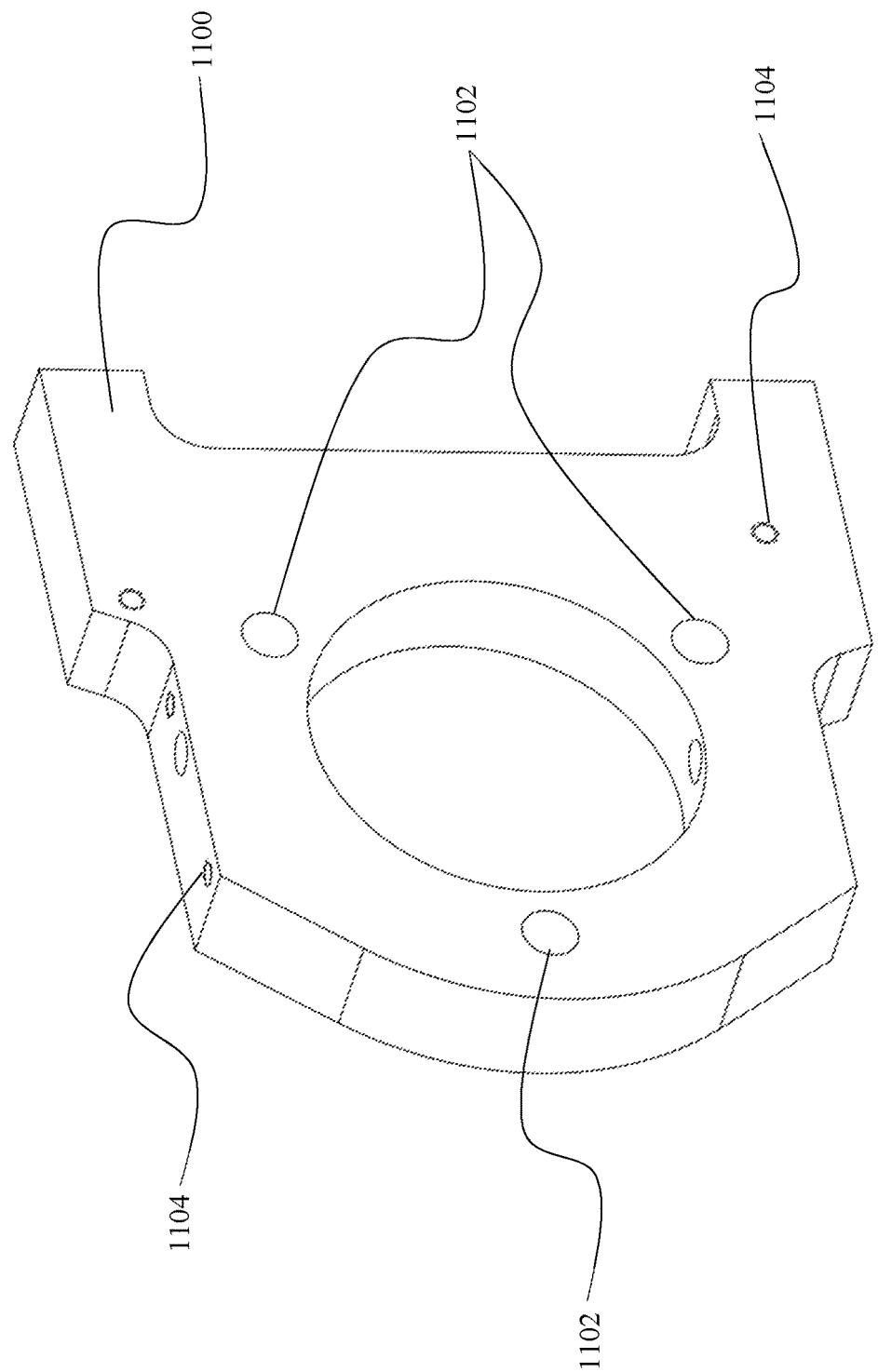
FIG. 11 is a perspective view of a mounting plate.

FIG. 11 shows a perspective view of a mounting plate 1100. The mounting plate 1100 comprises sixth openings 1102 which are used to rigidly fix the mounting plate 1100 to the orthogonal interface of the swing arm. The mounting plate 1100 further comprises housing openings which are used to rigidly fix a housing to the mounting plate as seen in FIG. 1. The mounting plate 1100 is also rigidly fixed to the non-driven wheel assembly, thus acting as an intermediary interface between the orthogonal interface of the swing arm and the non-driven wheel assembly. Although features of the mounting plate 1100 could be incorporated into the orthogonal interface of the swing arm, the use of a separate mounting plate 1100 reduces the complexity of the casting and machining of the swing arm. Thus overall manufacturing costs are reduced by the separate manufacturing of the swing arm and the mounting plate 1100 than the combined manufacturing in one piece of the two.

Figure 12:
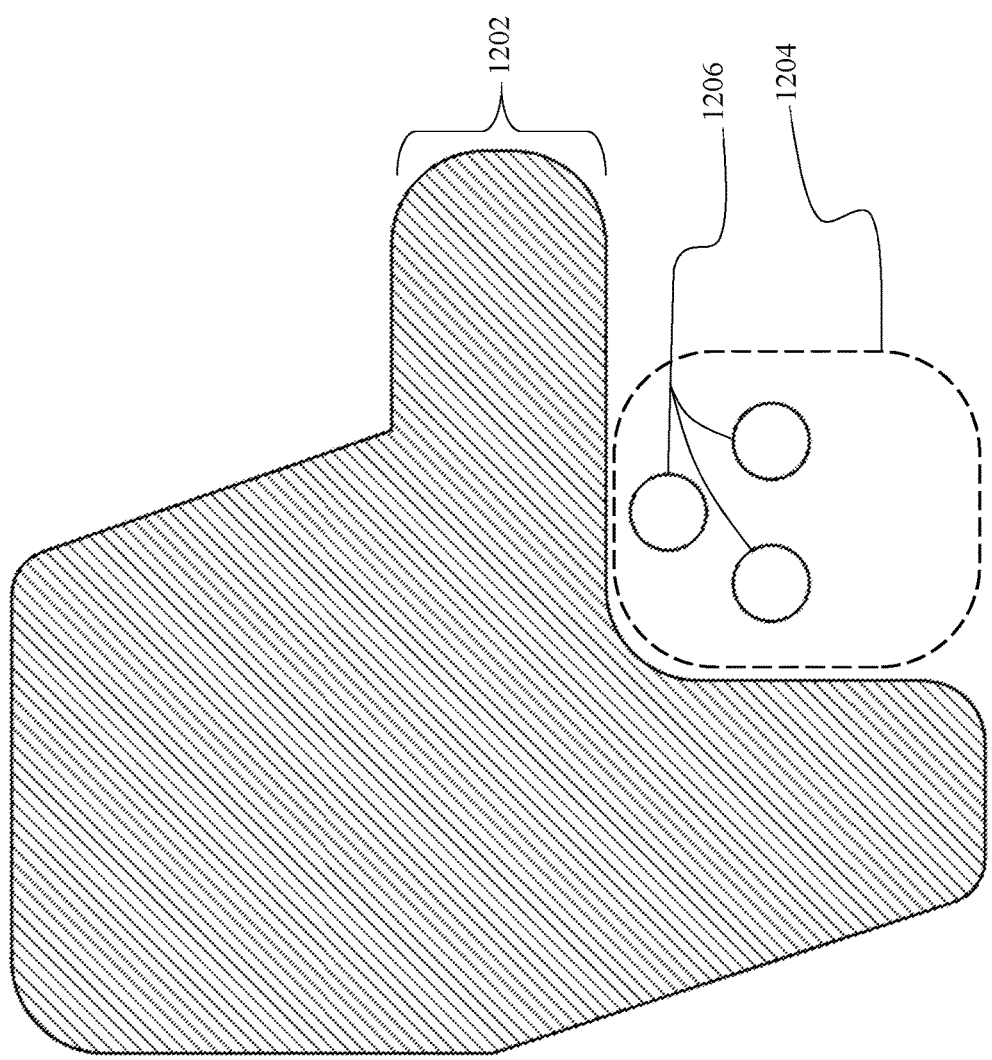
FIG. 12 is a cross-sectional view of the arm portion of a swing arm showing a rectangular trough.

FIG. 12 shows a cross-sectional view of one embodiment of the trough of the swing arm. This view shows that a rib 1202 separates the top and underside of the cross-section of the arm portion of the swing arm. A trough 1204 is shown on the underside of the swing arm having a generally rectangular shape. The trough 1204 makes space on the underside of the swing arm through which non-driven wheel assembly components 1206 (such as brake lines and sensor wires) can be passed. The non-driven wheel assembly components 1206 are secured to the swing arm in a manner detailed in FIG. 7. In addition, the trough 1206 protects the non-driven wheel assembly components 1206 from debris due to the trough 1206 location underneath the rib 1202.

Figure 13:
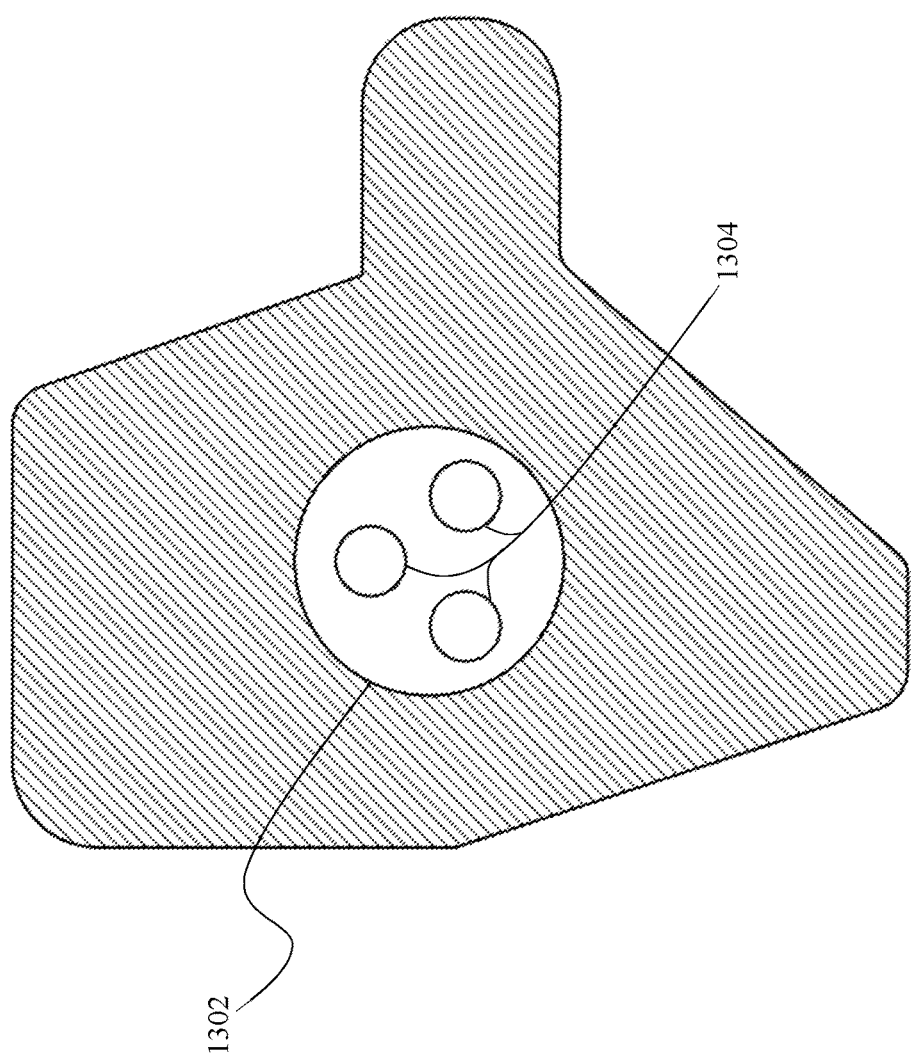
FIG. 13 is a cross-sectional view of the arm portion of a swing arm showing an enclosed circular trough.

FIG. 13 shows a cross-sectional view of another embodiment of the trough of the swing arm. This view shows a trough 1302 which is circular in cross-sectional shape and through which non-driven wheel assembly components 1304 are passed. The trough 1302 is fully enclosed by the swing arm. This embodiment of the trough 1302 has the advantage of fully protecting the non-driven wheel assembly components 1304 on all sides throughout the length of the swing arm. In addition, non-driven wheel assembly components 1304 need a minimal quantity of fasteners or other fixtures to be secured onto the swing arm, since the shape and location of the trough 1302 will keep the non-driven wheel assembly components 1304 somewhat secure by gravity alone.

Figure 14A:
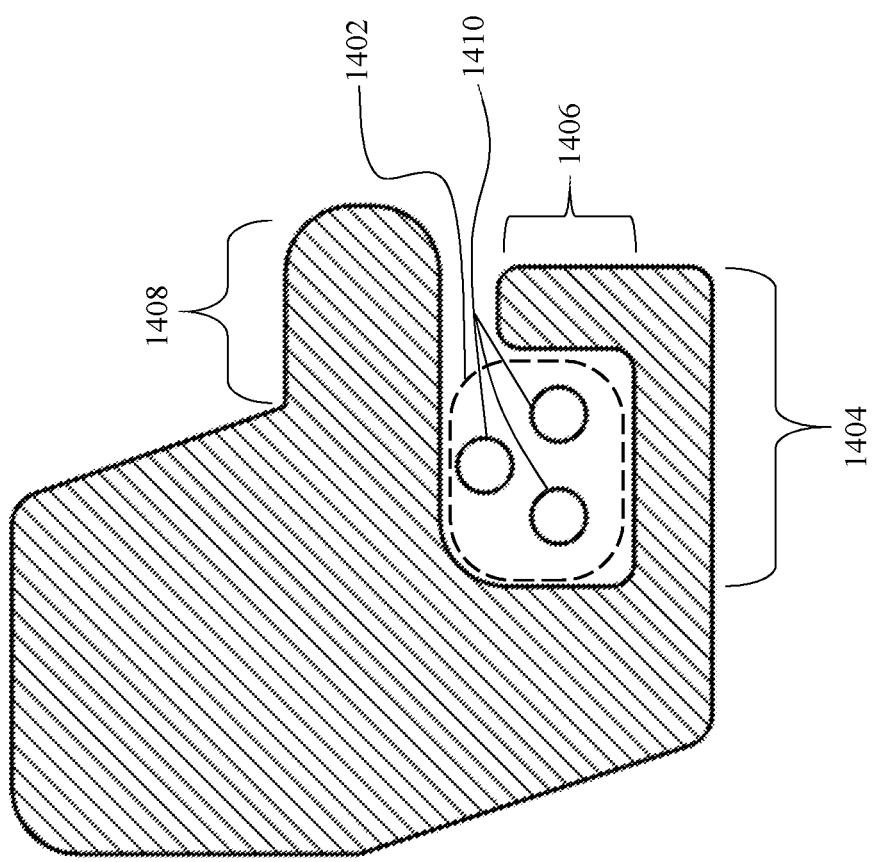
FIGS. 14A, 14B, and 14C are cross-sectional views of the arm portion of different embodiments of the swing arm showing a rectangular, circular, and trapezoidal trough respectively.
Figure 14C:
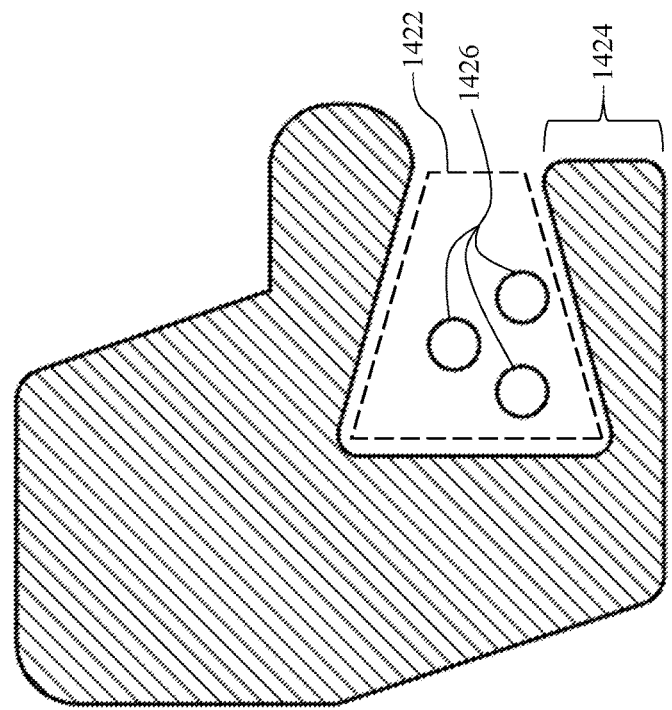
Figure 14B:
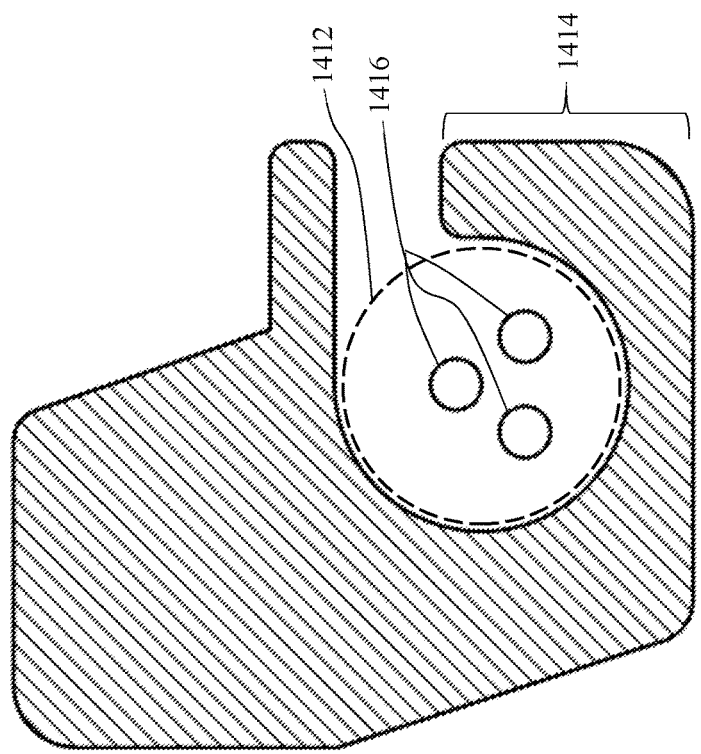

FIGS. 14A, 14B, and 14C show cross-sectional views of three additional embodiments of the trough of the swing arm. FIG. 14A shows a trough 1402 which is generally rectangular in cross-sectional shape, the trough 1402 further comprising a retaining wall 1404 and a retaining lip 1406. The trough 1402 is located on the underside of the swing arm under the rib 1408. Non-driven wheel assembly components 1410 are inserted into the trough 1410 through the gap between the rib 1408 and the retaining lip 1406. The non-driven wheel assembly components 1410 rest on the retaining wall 1404 while the retaining lip 1406 prevents the non-driven wheel assembly components 1410 from being dislodged from the trough by forces inherent in vehicle movement. This embodiment has the advantage of protecting non-driven wheel assembly components 1410 from debris while also allowing easy access to said non-driven wheel assembly components 1410 for maintenance or replacement. In addition, because non-driven wheel assembly components 1410 can rest against the retaining wall 1404 due to gravity, fewer fasteners or fixtures are required to secure said non-driven wheel assembly components 1410. FIG. 14B shows a trough 1412 which is generally circular in cross-sectional shape, the trough 1412 further comprising a retaining lip 1414. Non-driven wheel assembly components 1416 are inserted into the trough in a similar manner to the embodiment of the trough shown in FIG. 14A. FIG. 14C shows a trough 1422 which is generally trapezoidal in cross-sectional shape, the trough 1422 further comprising a retaining lip 1424. Non-driven wheel assembly components 1426 are inserted into the trough in a similar manner to the embodiment of the trough shown in FIG. 14A.

In the drawings and associated description, several geometries of orthogonal interfaces and several geometries of troughs for the swing arm have been shown. These geometries have been presented by way of example and not limitation. Other geometries may also be used to increase manufacturability or swing arm strength. Thus, other geometries are possible within the scope of the present invention.

The apparatuses disclosed herein may be embodied in other specific forms without departing from their spirit or essential characteristics. The described embodiments are to be considered in all respects only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A swing arm comprising:
   a yoke portion comprising a first pivotal axis and a second pivotal axis, the first pivotal axis being pivotally fixed to a first vehicle frame member and the second pivotal axis being pivotally fixed to a second vehicle frame member, the first pivotal axis and the second pivotal axis being coaxial;
   an arm portion extending from the first pivotal axis or the second pivotal axis of the yoke portion, the arm portion comprising a third pivotal axis, the third pivotal axis being pivotally fixed to a suspension system, the arm portion further comprising a vertical, planar mounting surface on an end of the arm portion distal from the yoke portion, the mounting surface further comprising a plurality of horizontal bolt holes, the mounting surface configured for removable attachment to a mounting plate of a non-driven wheel assembly;
   wherein the yoke portion and the arm portion and the mounting surface are a single body.

2. The swing arm of claim 1, wherein the trough is fully enclosed by the swing arm.

3. The swing arm of claim 1, wherein the yoke portion is U-shaped.

4. The swing arm of claim 1, wherein the first pivotal axis of the yoke portion comprises a first opening and the second pivotal axis of the yoke portion comprises a second opening.

5. The swing arm of claim 1, wherein the third pivotal axis of the arm portion comprises a third opening.

6. The swing arm of claim 1, wherein the yoke portion further comprises fourth openings attached to a fender assembly, the fender assembly further comprising welded tab and slot panels and a wheel guard.

7. The swing arm of claim 1, wherein the swing arm further comprises a rib between at least a portion of the arm portion and at least a portion of the yoke portion.

8. The swing arm of claim 1, wherein the orthogonal interface of the arm portion is generally triangular in shape with rounded corners, the orthogonal interface further comprising three fifth openings, one fifth opening being at each rounded corner of the orthogonal interface.

9. The swing arm of claim 1, wherein the general shape of the orthogonal interface of the arm portion is selected from the group of shapes consisting of a square, pentagon, hexagon, heptagon, octagon, nonagon, and decagon or a combination thereof.

10. The swing arm of claim 1, wherein the arm portion is arcuate in shape.

11. The swing arm of claim 1, wherein the arm portion further comprises a suspension system interface about the third pivotal axis, the suspension system being pivotally fixed to the third pivotal axis and parallel to the suspension system interface.

12. The swing arm of claim 1, wherein the first vehicle frame member and the second vehicle frame member are comprised of welded tab and slot panels.

13. The swing arm of claim 1, wherein the non-driven wheel assembly further comprises a bearing housing, a brake disk, brake calipers, and a housing.

14. The swing arm of claim 1, wherein the swing arm is attached to a reverse trike roadster.

15. The swing arm of claim 1, wherein said swing arm is manufactured using a process selected from the group of manufacturing processes consisting of casting, forging, machining, drilling, reaming, honing, and grinding.

16. The swing arm of claim 1 wherein the yoke portion and the arm portion and the mounting surface are a single cast body.

17. The swing arm of claim 1 wherein the first pivotal axis and the second pivotal axis are perpendicular to a direction of travel of a vehicle comprising the swing arm, and the vertical planar mounting surface is parallel to the direction of travel, and the plurality of horizontal bolt holes are parallel to the first pivotal axis and the second pivotal axis.

18. The swing arm of claim 1, further comprising a trough on an underside of the swing arm.

19. The swing arm of claim 18, wherein a general cross-sectional shape of the trough is selected from the group of shapes consisting of a circle, a rectangle, a square, and a trapezoid.

20. The swing arm of claim 18, wherein the trough comprises a retaining wall, the retaining wall comprising a retaining lip.

* * * * *